ary detailed description of the invention.
United States Patent Office
3,355,246
Patented Nov. 28, 1967

3,355,246
CRYSTALLINE ZEOLITE ZK-21
Guenter H. Kuehl, Morrisville, Pa., assignor to Mobil Oil Corporation, a corporation of New York
No Drawing. Filed July 18, 1966, Ser. No. 565,715
9 Claims. (Cl. 23—113)

ABSTRACT OF THE DISCLOSURE

As a new zeolite, ZK-21, a crystalline aluminosilicate having a crystal structure similar to zeolite A and a silica to alumina mol ratio ranging from about 1.9 to 4.5, prepared from a mixed sodium tetramethylammonium system containing phosphate, capable of sorbing straight-chain hydrocarbons while excluding branched-chain and cyclic hydrocarbons.

---

This application is a continuation-in-part of Ser. No. 294,229, filed July 11, 1963, now abandoned.

This invention relates to new crystalline aluminosilicates and to methods for their preparation.

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K or Li, is equal to unity. One type of cation may be exchanged either in entirety or partially by another type of cation utilizing ion exchange techniques in a conventional manner. By means of such cation exchange, it is possible to vary the size of the pores in the given aluminosilicate by suitable selection of the particular cation. The spaces between the tetrahedra are occupied by molecules of water prior to dehydration.

Synthetic crystalline aluminosilicates are ordinarily prepared initially in the sodium or potassium form of the crystal, the process of preparation involving heating, in aqueous solution, an appropriate mixture of oxides, or of materials whose chemical composition can be completely represented as a mixture of oxides $Na_2O$, $Al_2O_3$, $SiO_2$ and $H_2O$, at a temperature of approximately 100° C. for periods of 15 minutes to 90 hours or more. The product which crystallizes within this hot mixture is separated therefrom and water washed until the water in equilibrium with the aluminosilicate has a pH in the range of 9 to 12. The aluminosilicate may then be activated by heating until dehydration is attained.

A description of such aluminosilicates, methods for their preparation and examples of their uses are found in U.S. 2,882,243, 2,971,824, 3,033,778, and 3,247,195.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,882,244), zeolite K-G (U.S. 3,055,654), and zeolite ZK-5 (U.S. 3,247,195), merely to name a few.

It is accordingly a primary object of the present invention to provide a new variety of synthetic crystalline aluminosilicate and novel methods for preparing such crystalline aluminosilicate.

It is a further important object of the present invention to provide novel, synthetic, crystalline aluminosilicates which are good selective sorbents for straight chain hydrocarbons but whose sorption of branched chain and cyclic hydrocarbons is low.

It is another important object of the present invention to provide novel methods for synthesizing crystalline aluminosilicates involving the use of reaction mixtures containing complexes which increase the $SiO_2/Al_2O_3$ ratio of the resulting products.

These and other important objects and advantages will flow and become more apparent from the following detailed description of the invention.

The present invention relates to a novel synthetic crystalline aluminosilicate hereinafter designated as "zeolite ZK-21" and to methods for its preparation. This new zeolitic material which is conveniently prepared crystallizes in the sodium form and contains intercalated phosphate.

Zeolite ZK-21 has a crystal structure similar to zeolite A, which is described in above-mentioned U.S. 2,882,243. Although ZK-21 is structurally similar to zeolite A, there are a number of significant differences between the two. ZK-21 has a silica to alumina mol ratio ranging from about 1.9 to 4.5, whereas zeolite A has been obtainable, in the prior art, only at silica to alumina mol ratios of about 2.35 or less, down to about 1.35. As mentioned above, ZK-21, unlike zeolite A, contains intercalated phosphate when crystallized from its reaction mixture. Another difference between the subject zeolite and sodium zeolite A is the ability of ZK-21, in one of the specific embodiments of this invention, i.e., at silica to alumina mol ratios above about 2.8, unlike sodium zeolite A, to sorb straight chain hydrocarbons of any length while excluding branched-chain and cyclic hydrocarbons, the smallest of which are not sorbed, for example, being isobutane and cyclopentane. At silica to alumina mole ratios of about 2.8 the rate of straight chain hydrocarbon sorption decreases fast. Still another difference is that the lattice parameter of ZK-21, hereinafter designated as $a_0$, is smaller than zeolite A, with $a_0$ for ZK-21 being about 12.21 and 12.14 at silica to alumina mol ratios of 2.8 and 3.5, respectively, and for zeolite A, $a_0$ being 12.32± 0.02 A. The X-ray diffraction pattern of a ZK-21 sample having a silica to alumina mol ratio of 3.26 showed the following lines:

TABLE I

| d(A.) | I/I₀ | hkl | d(A.) | I/I₀ | hkl |
|---|---|---|---|---|---|
| 12.16 | 100 | 100 | 2.227 | 3 | 521 |
| 8.65 | 68 | 110 | 2.154 | 10 | 440 |
| 7.07 | 63 | 111 | 2.122 | 4 | 441 |
| 5.48 | 29 | 210 | 2.093 | 3 | 530 |
| 5.02 | 4 | 211 | 2.061 | 3 | 531 |
| 4.33 | 15 | 220 | 2.033 | 9 | 600 |
| 4.07 | 63 | 300 | 1.904 | 7 | 621 |
| 3.86 | 3 | 310 | 1.881 | 5 | 541 |
| 3.675 | 83 | 311 | 1.839 | 2 | 622 |
| 3.389 | 30 | 320 | 1.818 | 2 | 630 |
| 3.264 | 59 | 321 | 1.740 | 2 | 632 |
| 2.952 | 77 | 410 | 1.722 | 14 | 710 |
| 2.878 | 15 | 411 | 1.706 | 2 | 711 |
| 2.732 | 10 | 420 | 1.674 | 8 | 641 |
| 2.664 | 5 | 421 | 1.659 | 2 | 721 |
| 2.601 | 32 | 332 | 1.615 | 4 | 722 |
| 2.491 | 9 | 422 | 1.586 | 5 | 731 |
| 2.441 | 4 | 430, 500 | 1.560 | 5 | 650 |
| 2.395 | 2 | 510 | | | |
| 2.348 | 6 | 511 | | | |

The composition of zeolite ZK–21 may, in its dehydrated form, be expressed in terms of approximate mol ratios of oxides as follows:

$$1.0 \pm 0.2\ M_{2/n}O : Al_2O_3 : YSiO_2 : ZP_2O_5$$

wherein M represents a metal, $n$ is the valence of the metal, Y is 1.9 to 4.5, and Z is 0.01 to $(Y+2)/48$.

As initially prepared from the reaction mixture ZK–21 crystallizes in the sodium form, making it advantageously directly ion-exchangeable with other metal cations. Sodium metasilicate is a preferred source of silica, however, other silica sources such as colloidal silica sol and waterglass may be used satisfactorily. Aluminum, introduced as sodium aluminate, is complexed by phosphate ions in order to decrease the concentration of hydroxyaluminate ions as described in copending application, Ser. No. 294,229, heretofore identified. The cation source is a combination of sodium and tetramethylammonium ions, the latter being in the hydroxide form, or advantageously, in the less expensive chloride or bromide form.

Zeolite ZK–21 may be prepared from a reaction mixture having the following reactants expressed in mol ratios: $SiO_2/Al_2O_3$ between about 3 and 10, preferably about 3 to 6; $P_2O_5/Al_2O_3$ at least about 2, preferably about 4; $Na_2O/(Na_2O+[(CH_3)_4N]_2O)$ between about 0.10 and 0.55 preferably 0.1 to 0.4;

$$(Na_2O+[(CH_3)_4N]_2O)/P_2O_5$$

between about 2 and 10, preferably about 2.5 to 5. Although $P_2O_5/Al_2O_3$ is stated as preferably about 4, this is not critical, since large excesses of $PO_4^{3-}$ ions can be compensated for by raising the reaction pH.

Zeolite ZK–21 is synthesized by the complexing technique, as mentioned above, described in copending application Serial No. 294,229. That application described a procedure whereby crystalline aluminosilicates having higher $SiO_2/Al_2O_3$ ratios than would otherwise be attainable with a given starting mixture may be synthesized through the utilization of a reaction mixture containing a complex which serves to regulate the quantity of alumina available to form the desired aluminosilicate. It was pointed out therein that the $SiO_2/Al_2O_3$ ratio in the crystalline aluminosilicate product bore a direct relationship to the quantity of complex hydroxyaluminate ions $[Al(OH)_4]^-$ in the reaction mass with a given concentration of $SiO_2$. Though a variety of complexing agents were mentioned in said copending application Ser. No. 294,229, as suitable for the complexing function in question, the phosphatoaluminate complex was indicated to be the most desirable and effective. Such phosphatoaluminate complex and the mechanism by which it works is employed for synthesizing the zeolite ZK–21 of the present invention. Indeed, ZK–21 is not obtained in the absence of phosphate.

The size of the anionic species in solution during the crystallization of a zeolite is dependent on the pH of the solution. The higher the pH, the smaller are the anionic species; the lower the pH, the larger are the anionic species. Also, the lower the pH, the more different anionic species are present in significant amounts and in equilibrium with one another. It can be expected that the zeolite A structure is formed at a higher pH than the faujasite structure under otherwise identical conditions. This seems to be the case. However, when the crystallizing structure changes from X to A, the pH is so high that the silica to alumina ratio of the resulting zeolite is low. A higher $SiO_2/Al_2O_3$ ratio of the zeolite A structure has not been obtained by this procedure.

When a zeolite crystallizes, the number of cationic charges incorporated in the zeolite structure is equal to the number of aluminum atoms in the zeolite framework. Obviously, if only a small number of cations are available, the amount of aluminum being included in the zeolite framework is limited.

So by using cations which are unlikely to be incorporated because of their size, presumably, the number of cations available for the zeolite crystallization can be limited without effecting the pH of the reaction mixture, which is above about 11.

In the examples below, tetramethylammonium hydroxide was used to provide the large cations and the OH⁻ ions.

*Example 1*

Sodium aluminate 2.95 g. (43.3% $Al_2O_3$; 37.7% $Na_2O$), equivalent to 12.5 millimoles of $Al_2O_3$, was dissolved in 20 ml. of water. A solution made by mixing 76 g. of a 25% solution of tetramethylammonium hydroxide (209 millimoles) and 11.5 g. of an 85% phosphoric acid (100 millimoles) was added and the volume adjusted to 100 ml. with water. Then a solution of 13.75 g. (50 millimoles) of sodium metasilicate (24.55% $Na_2O$; 21.9% $SiO_2$) in 50 ml. of water was added under stirring within two seconds. The stirring was discontinued when a gel had formed, and the flask with the reaction mixture was placed at constant temperature of 96° C. After five days the crystallization was complete.

The composition of the reaction mixture can be summarized as follows—

Molar ratio:
| | |
|---|---|
| $SiO_2/Al_2O_3$ | 4.0 |
| $Na_2O/Al_2O_3$ | 5.72 |
| $(Na_2O+[(CH_3)_4N]_2O)/Al_2O_3$ | 14.0 |
| $Na_2O/(Na_2O+[(CH_3)_4N]_2O)$ | 0.406 |
| $(Na_2O+[(CH_3)_4N]_2O)/P_2O_5$ | 3.52 |
| $P_2O_5/Al_2O_3$ | 3.99 |
| $H_2O/(Na_2O+[(CH_3)_4N]_2O)$ ca | 47 |

The properties of the product were—

Wt. percent:
| | |
|---|---|
| $SiO_2$ | 53.2 |
| $Al_2O_3$ | 27.6 |
| $Na_2O$ | 17.0 |
| $SiO_2/Al_2O_3$ | 3.26 |
| $Na_2O/Al_2O_3$ | 1.01 |
| Crystal structure | ZK–21 |

Sorption, g./100 g. of zeolite:[a]
| | |
|---|---|
| Cyclohexane | 1.3 |
| n-Hexane | 12.2 |
| Water | 23.0 |

2.67% C; 0.70% N; 1.05% P; (on hydrated basis) 79.0% ash; C/N=4.46; N/P=1.48.

[a] The sorption data were measured at 20 mm. Hg for cyclohexane and n-hexane and at 12 mm. Hg for water.

It has been found, above, that ZK–21 preparations contain small amounts of carbon, nitrogen and phosphorus:

The nitrogenous material does not constitute zeolitic tetramethylammonium ions, however. The sodium ions present are sufficient to balance the negative charges on the framework-Al. In order to determine whether all the sodium ions are zeolitic, the product of Example 1 was exchanged with calcium ions. The results were as follows—

Wt. percent:
  SiO$_2$ _____ a 53.1
  Al$_2$O$_3$ _____ a 27.6
  Na$_2$O _____ a 0.61
  CaO _____ a 15.5
  N _____ b 0.68
SiO$_2$/Al$_2$O$_3$ _____ 3.27
(Na$_2$O+CaO)/Al$_2$O$_3$ _____ 1.04 a Ignited weight basis.
b Hydrated basis.

Refluxing with calcium nitrate solution eventually reduced the sodium content to 0.05% Na$_2$O while the nitrogen content remained constant within the analytical tolerance (0.65% N).

This experiment demonstrates that all the sodium is zeolitic. Since Na/Al is 1 (within the analytical accuracy), the nitrogenous material cannot be zeolitic.

Since the phosphate would be precipitated as calcium phosphate if it were removed from the zeolite, and so remain in the sample, the calcium exchange experiment does not necessarily demonstrate whether the phosphate is adsorbed on the surface of the crystals or intercalated within the zeolite. Treatment of the product of Example 1 with sodium chloride, however, showed that the phosphate was not removed—

Wt. percent:
  SiO$_2$ _____ a 52.5
  Al$_2$O$_3$ _____ a 27.4
  Na$_2$O _____ a 17.2
  C _____ b 2.58
  N _____ b 0.70
  P _____ b 1.03 a Ignited weight basis.
b Hydrated weight basis.

Thus it has to be assumed that some nitrogenous phosphate is intercalated. Upon calcination, carbon and nitrogen are removed while the phosphate remains behind. This phosphate is considered to be the reason for the water sorption to be consistently somewhat low. The amount of phosphate is never greater than 1 P/sodalite cage.

Zeolite ZK–21 crystallizes also from reaction mixtures having a lower silica to alumina ratio than 4. This is demonstrated in the next example.

*Example 2*

Sodium aluminate, 2.95 g. (43.3% Al$_2$O$_3$; 37.7% Na$_2$O), equivalent to 12.5 millimoles of Al$_2$O$_3$, was dissolved in 20 ml. of water. A solution made by mixing 76 g. of a 25% solution of tetramethylammonium hydroxide (209 millimoles) and 11.5 g. of an 85% phosphoric acid (100 millimoles) was added and the volume adjusted to 100 ml. with water. Then a solution of 10.33 g. (37.5 millimoles) of sodium metasilicate (24.55% Na$_2$O; 21.9% SiO$_2$) in 50 ml. of water was added under stirring within two seconds. The stirring was discontinued, when a gel had formed, and the flask with the reaction mixture was placed at constant temperature of 90° C. After six days the crystallization was complete.

The composition of the reaction mixture can be summarized as follows—

Molar ratio:
  SiO$_2$/Al$_2$O$_3$ _____ 3.0
  Na$_2$O8Al$_2$O$_3$ _____ 4.66
  (Na$_2$O+[(CH$_3$)$_4$N]$_2$O)/Al$_2$O$_3$ _____ 13.0
  Na$_2$O/(Na$_2$O+[(CH$_3$)$_4$N]$_2$O) _____ 0.359
  Na$_2$O+[(CH$_3$)$_4$N]$_2$O)/P$_2$O$_5$ _____ 3.26
  P$_2$O$_5$/Al$_2$O$_3$ _____ 3.99
  H$_2$O/(Na$_2$O+[(CH$_3$)$_4$N]$_2$O) _____ca__ 51

The properties of the product were—

Wt. percent:
  SiO$_2$ _____ 50.4
  Al$_2$O$_3$ _____ 27.8
  Na$_2$O _____ 17.5
SiO$_2$/Al$_2$O$_3$ _____ 3.09
Na$_2$O/Al$_2$O$_3$ _____ 1.03
Crystal structure _____ ZK–21
Sorption, g./100 g. of zeolite:
  Cyclohexane _____ 1.3
  n-Hexane _____ 12.1
  Water _____ 21.6

1.11% N; 1.00% P; (hydrated basis) 78.5% ash; N/P=2.45.

If a very high alkalinity is used in the preparation of zeolite ZK–21, lower silica to alumina ratios are obtained, as demonstrated by the following example.

*Example 3*

Sodium aluminate, 1.47 g. (43.3% Al$_2$O$_3$; 37.7% Na$_2$O), equivalent to 6.25 millimoles of Al$_2$O$_3$, was dissolved in 10 ml. of water. A solution made by mixing 57 g. of a 25% solution of tetramethylammonium hydroxide (157 millimoles) and 5.75 g. of an 85% phosphoric acid (50 millimoles) was added and the volume adjusted to 80 ml. with water. Then a solution of 6.88 g. (25 millimoles) of sodium metasilicate (24.55% Na$_2$O; 21.9% SiO$_2$) in 15 ml. of water was added under stirring within two seconds. The stirring was discontinued, when a gel had formed, and the flask with the reaction mixture was placed at constant temperature of 90° C. After one day the crystallization was complete.

The composition of the reaction mixture can be summarized as follows—

Molar ratio:
  SiO$_2$/Al$_2$O$_3$ _____ 4.0
  Na$_2$O/Al$_2$O$_3$ _____ 5.72
  (Na$_2$O+[(CH$_3$)$_4$N]$_2$O)/Al$_2$O$_3$ _____ 18.2
  Na$_2$O/(Na$_2$O+[(CH$_3$)$_4$N]$_2$O) _____ 0.315
  (Na$_2$O+[(CH$_3$)$_4$N]$_2$O)/P$_2$O$_5$ _____ 4.56
  P$_2$O$_5$/Al$_2$O$_3$ _____ 3.99
  H$_2$O/(Na$_2$O+[(CH$_3$)$_4$N]$_2$O) _____ca__ 46

The properties of the product were—

Wt. percent:
  SiO$_2$ _____ 48.1
  Al$_2$O$_3$ _____ 29.4
  Na$_2$O _____ 18.7
SiO/Al$_2$O$_3$ _____ 2.79
Na$_2$O/Al$_2$O$_3$ _____ 1.04
Crystal structure _____ ZK–21
Sorption, g./100 g. of zeolite:
  Cyclohexane _____ 7.03
  n-Hexane _____ 11.0
  Water _____ 21.7

2.08% C; 0.55% N; 0.92% P; (hydrated basis) 79.5% ash; C/N=4.41; N/P=1.32

The higher SiO$_2$/Al$_2$O$_3$ ratios in Examples 1 and 2 are evidence of the action of the phosphate. As explained in copending U.S. application Ser. No. 294,229 the effect of the phosphate decreases with rising pH, as can be seen by Example 3.

The sorption of n-hexane by the product of Example 3 occurs at a somewhat slower rate, an indication that the rate of n-hexane diffusion into the zeolite is presumably affected by the greater number of cations present.

In Example 2 the preparation of zeolite ZK–21 from a reaction mixture having a silica to alumina molar ratio of 3 has been disclosed. If the SiO$_2$/Al$_2$O$_3$ molar ratio is lowered to 2, a material of the same crystal structure, but of a lower SiO$_2$/Al$_2$O$_3$ ratio is obtained. The product has sorptive properties like zeolite A, but contains phosphate. This is shown in the next example.

Example 4

Sodium aluminate, 2.95 g. (43.3% $Al_2O_3$; 37.7% $Na_2O$), equivalent to 12.5 millimoles of $Al_2O_3$, was dissolved in 20 ml. of water. A solution made by mixing 76 g. of a 25% solution of tetramethylammonium hydroxide (209 millimoles) and 11.5 g. of an 85% phosphoric acid (100 millimoles) was added and the volume adjusted to 110 ml. with water. Then a solution of 6.88 g. (25 millimoles) of sodium metasilicate (24.55% $Na_2O$; 21.9% $SiO_2$) in 40 ml. of water was added under stirring within two seconds. No gel formed upon mixing. After two minutes stirring was discontinued, and the flask with the reaction mixture was placed at constant temperature of 90° C. After 12 days the crystallization was complete.

The composition of the reaction mixture can be summarized as follows—

Molar ratio:
| | |
|---|---|
| $SiO_2/Al_2O_3$ | 2.0 |
| $Na_2O/Al_2O_3$ | 3.58 |
| $(Na_2O+[(CH_3)_4N]_2O)/Al_2O_3$ | 12.55 |
| $Na_2O/(Na_2O+[(CH_3)_4N]_2O)$ | 0.291 |
| $(Na_2O+[(CH_3)_4N]_2O)/P_2O_5$ | 3.08 |
| $P_2O_5/Al_2O_3$ | 3.99 |
| $H_2O/(Na_2O+[(CH_3)_4N]_2O)$ ca. | 54 |

The properties of the product were—

Wt. percent:
| | |
|---|---|
| $SiO_2$ | a 40.9 |
| $Al_2O_3$ | a 33.7 |
| $Na_2O$ | a 20.6 |
| C | b 2.52 |
| N | b 0.58 |
| P | b 1.41 |
| Ash | 80.5 |
| $SiO_2/Al_2O_3$ | 2.06 |
| $Na_2O/Al_2O_3$ | 1.00 |
| C/N | 5.08 |
| N/P | 0.91 |
| Crystal structure | ZK-21 |

Sorption, g./100 g. of zeolite:
| | |
|---|---|
| n-Hexane | 1.9 |
| Water | 21.5 | a Ignited weight basis.
b Hydrated basis.

Higher $SiO_2/Al_2O_3$ molar ratios like 5 and 6 tend to yield mixtures of ZK-21 and zeolite X, if the ratio of tetramethylammonium to phosphate in the reaction mixture is about 2. If tri(tetramethylammonium) phosphate is used, however, a pure zeolite ZK-21 can also be prepared from a reaction mixture having a $SiO_2/Al_2O_3$ molar ratio of 6, as is demonstrated in the following example:

Example 5

Sodium aluminate, 1.47 g. (43.3% $Al_2O_3$; 37.7% $Na_2O$), equivalent to 6.25 millimoles of $Al_2O_3$, was dissolved in 15 ml. of water. A solution made by mixing 57 g. of a 25% solution of tetramethylammonium hydroxide (157 millimoles) and 5.75 g. of an 85% phosphoric acid (50 millimoles) was added and the volume adjusted to 80 ml. with water. Then a solution of 10.33 g. (37.5 millimoles) of sodium metasilicate (24.55% $Na_2O$; 21.9% $SiO_2$) in 25 ml. of water was added under stirring within two seconds. The stirring was discontinued, and the flask with the reaction mixture was placed at constant temperature of 90° C. After two days the crystallization was complete.

The composition of the reaction mixture can be summarized as follows—

Molar ratio:
| | |
|---|---|
| $SiO_2/Al_2O_3$ | 6.0 |
| $Na_2O/Al_2O_3$ | 7.84 |
| $(Na_2O+[(CH_3)_4N]_2O)/Al_2O_3$ | 20.35 |
| $Na_2O/(Na_2O+[(CH_3)_4N]_2O)$ | 0.386 |
| $(Na_2O+[(CH_3)_4N]_2O)/P_2O_5$ | 5.1 |
| $P_2O_5/Al_2O_3$ | 3.99 |
| $H_2O/(Na_2O+[(CH_3)_4N]_2O)$ ca. | 46 |

The properties of the product were—

Wt. percent:
| | |
|---|---|
| $SiO_2$ | a 52.2 |
| $Al_2O_3$ | a 28.0 |
| $Na_2O$ | a 18.45 |
| N | b 0.56 |
| P | b 1.00 |
| Ash | 78.1 |
| $SiO_2/Al_2O_3$ | 3.16 |
| $Na_2O/Al_2O_3$ | 1.08 |
| N/P | 1.28 |
| Crystal structure | ZK-21 |

Sorption, g./100 g. of zeolite:
| | |
|---|---|
| Cyclohexane | 0.40 |
| n-Hexane | 11.9 |
| Water | 22.2 | a Ignited weight basis.
b Hydrated basis.

When the di(tetramethylammonium) hydrogen phosphate of Example 1 was substituted by tetramethylammonium bromide, so that the amount of tetramethylammonium ions was the same, no zeolite A structure was formed. The main product was zeolite X. Raising the amount of tetramethylammonium bromide caused zeolite B to crystallize eventually.

Addition of tetramethylammonium bromide to a reaction mixture similar to Example 3 increased the $SiO_2/Al_2O_3$ ratio of the product slightly, as shown in this next example.

Example 6

Sodium aluminate, 1.47 g. (43.3% $Al_2O_3$; 37.7% $Na_2O$), equivalent to 6.25 millimoles of $Al_2O_3$, was dissolved in 15 ml. of water. A solution made by mixing 57 g. of 25% solution of tetramethylammonium hydroxide (157 millimoles) and 5.75 g. of 85% phosphoric acid (50 millimoles) was added together with 23.1 g. of tetramethylammonium bromide. The salt was dissolved and the volume of the mixture adjusted to 110 ml. with water. A solution of 6.88 g. (25 millimoles) of sodium metasilicate (24.55% $Na_2O$; 21.9% $SiO_2$) in 25 ml. of water was added under stirring within two seconds. The stirring was discontinued, and the flask with the reaction mixture was placed at constant temperature of 90° C. After two days the crystallization was complete.

The composition of the reaction mixture can be summarized as follows—

Molar ratio:
| | |
|---|---|
| $SiO_2/Al_2O_3$ | 4.0 |
| $Na_2O/Al_2O_3$ | 5.72 |
| $(Na_2O+[(CH_3)_4N]_2O)/Al_2O_3$ | 30.2 |
| $Na_2O/(Na_2O+[(CH_3)_4N]_2O)$ | 0.189 |
| $(Na_2O+[(CH_3)_4N]_2O$ a$)/P_2O_5$ | 4.58 |
| $P_2O_5/Al_2O_3$ | 3.99 |
| $H_2O/(Na_2O+[(CH_3)_4N]_2O)$ ca. | 40 | a $[(CH_3)_4N]_2O$ introduced as the hydroxide only.

The properties of the product were—

Wt. percent:
| | |
|---|---|
| $SiO_2$ | a 48.9 |
| $Al_2O_3$ | a 28.4 |
| $Na_2O$ | a 18.1 |
| C | b 2.56 |
| N | b 0.61 |
| P | b 1.13 |
| Ash | 83.4 |
| $SiO_2/Al_2O_3$ | 2.93 |
| $Na_2O/Al_2O_3$ | 1.05 |
| N/P | 1.2 |
| Crystal structure | ZK-21 |

$a_0 = 12.185 \pm 0.02$ A.

Sorption, g./100 g. of zeolite:
  Cyclohexane _____ 0.19
  n-Hexane _____ 11.2
  Water _____ 22.0

[a] Ignited weight basis.
[b] Hydrated basis.

It appears that the decrease of the mixture ratio $Na_2O/(Na_2O+[(CH_3)_4N]_2O)$ has little if any effect on the $SiO_2/Al_2O_3$ ratio of the product.

If higher $SiO_2/Al_2O_3$ ratios are used in the mixture, usually mixtures of zeolites ZK-21 and Y are obtained due to the higher sodium content introduced as sodium metasilicate. This adverse effect can be compensated to some extent by the addition of tetramethylammonium ions, e.g., as the bromide, as demonstrated in the next two examples.

Example 7

Sodium aluminate, 1.47 g. (43.3% $Al_2O_3$; 37.7% $Na_2O$), equivalent to 6.25 millimoles of $Al_2O_3$, was dissolved in 15 ml. of water. A solution made by mixing 57 g. of a 25% solution of tetramethylammonium hydroxide (157 millimoles) and 5.75 g. of an 85% phosphoric acid (50 millimoles) was added together with 6.78 g. of tetramethylammoninum bromide. The salt was dissolved and the volume of the mixture adjusted to 80 ml. with water. A solution of 13.75 g. (50 millimoles) of sodium metasilicate (24.55% $Na_2O$; 21.9% $SiO_2$) in 25 ml. of water was added under stirring. The stirring was discontinued, and the flask with the reaction mixture was placed at constant temperature of 90° C. After two days the crystallization was complete.

The composition of the reaction mixture can be summarized as follows—

Molar ratio:
  $SiO_2/Al_2O_3$ _____ 8.0
  $Na_2O/Al_2O_3$ _____ 10.0
  $(Na_2O+[(CH_3)_4N]_2O)/Al_2O_3$ _____ 26.0
  $Na_2O/(Na_2O+[(CH_3)_4N]_2O)$ _____ 0.384
  $(Na_2O+[(CH_3)_4N]_2O$ [a]$)/P_2O_5$ _____ 5.64
  $P_2O_5/Al_2O_3$ _____ 3.99
  $H_2O/Na_2O+[(CH_3)_4N]_2O)$ _____ca__ 36

[a] $[(CH_3)_4N]_2O$ introduced as the hydroxide only.

The properties of the product were—

Wt. percent:
  $SiO_2$ _____ [a] 51.7
  $Al_2O_3$ _____ [a] 26.4
  $Na_2O$ _____ [a] 18.0
  C _____ [b] 1.05
  N _____ [b] 0.62
  P _____ [b] 1.08
  Ash _____ 79.8
$Si_2O/Al_2O_3$ _____ 3.34
$Na_2O/Al_2O_3$ _____ 1.12
N/P _____ 1.27
Crystal structure _____ ZK-21
Sorption, g./100 g. of zeolite:
  Cyclohexane _____ 0.75
  n-Hexane _____ 11.9
  Water _____ 22.4

[a] Ignited weight basis.
[b] Hydrated basis.

Example 8

Sodium aluminate, 1.47 g. (43.3% $Al_2O_3$; 37.7% $Na_2O$), equivalent to 6.25 millimoles of $Al_2O_3$, was dissolved in 15 ml. of water. A solution made by mixing 57 g. of a 25% solution of tetramethylammonium hydroxide (157 millimoles) and 5.75 g. of an 85% phosphoric acid (50 millimoles) was added together with 12.62 g. of tetramethylammonium bromide. The salt was dissolved and the volume of the mixture adjusted to 80 ml. with water. A solution of 17.2 g. (62.5 millimoles) of sodium metasilicate (24.55% $Na_2O$; 21.9% $SiO_2$) in 25 ml. of water was added under stirring. The stirring was discontinued, and the flask with the reaction mixture was placed at constant temperature of 90° C. After two days the crystallization was complete.

The composition of the reaction mixture can be summarized as follows—

Molar ratio:
  $SiO_2/Al_2O_3$ _____ 10.0
  $Na_2O/Al_2O_3$ _____ 12.1
  $(Na_2O+[(CH_3)_4N]_2O)/Al_2O_3$ _____ 30.9
  $Na_2O/(Na_2O+[(CH_3)_4N]_2)$ _____ 0.382
  $(Na_2O+[(CH_3)_4N]_2O$ [a]$)/P_2O_5$ _____ 6.17
  $P_2O_5/Al_2O_3$ _____ 3.99
  $H_2O/(Na_2O+[(CH_3)_4N]_2O)$ _____ca__ 30

[a] $[(CH_3)_4N]_2O$ introduced as the hydroxide only.

The properties of the product were—

Wt. percent:
  $SiO_2$ _____ [a] 52.3
  $Al_2O_3$ _____ [a] 25.8
  $Na_2O$ _____ [a] 18.5
  C _____ [b] 2.46
  N _____ [b] 0.59
  P _____ [b] 1.04
  Ash _____ 79.4
$SiO_2/Al_2O_3$ _____ 3.45
$Na_2O/Al_2O_3$ _____ 1.18
N/P _____ 1.26
Crystal structure _____ ZK-21
  $a_0 = 12.15 \pm 0.02$ A.
Sorption, g./100 g. of zeolite:
  Cyclohexane _____ 1.3
  n-Hexane _____ 12.2
  Water _____ 23.0

[a] Ignited weight basis.
[b] Hydrated basis.

Waterglass can also be used as the silica source, as demonstrated in the next example.

Example 9

Sodium aluminate, 1.47 g. (43.3% $Al_2O_3$; 37.7% $Na_2O$), equivalent to 6.25 millimoles of $Al_2O_3$, was dissolved in 15 ml. of water. A solution made by mixing 57 g. of a 25% solution of tetramethylammonium hydroxide (157 millimoles) and 5.75 g. of an 85% phosphoric acid (50 millimoles) was added and the volume adjusted to 80 ml. Then a mixture of 5.2 g. (25 millimoles of $SiO_2$) of commercial waterglass Q (8.9% $Na_2O$; 28.7% $SiO_2$) and 15 ml. of water was added under stirring. The stirring was discontinued and the flask with the reaction mixture placed in a bath at 90° C. After 13 days the crystallization was complete.

The composition of the reaction mixture can be summarized as follows—

Molar ratio:
  $SiO_2/Al_2O_3$ _____ 4.0
  $Na_2O/Al_2O_3$ _____ 2.63
  $(Na_2O+[(CH_3)_4N]_2O)/Al_2O_3$ _____ 15.15
  $Na_2O/(Na_2O+[(CH_3)_4N]_2O)$ _____ 0.174
  $(Na_2O+[(CH_3)_4N]_2O)/P_2O_5$ _____ 3.8
  $P_2O_5/Al_2O_3$ _____ 3.99
  $H_2O/(Na_2O+[(CH_3)_4N]_2O)$ _____ca__ 56

The properties of the product were—

Wt. percent:
  $SiO_2$ _____ [a] 51.0
  $Al_2O_3$ _____ [a] 28.5
  $Na_2O$ _____ [a] 18.4
  C _____ [b] 3.27
  N _____ [b] 0.77
  P _____ [b] 0.85
  Ash _____ 81.0

| | |
|---|---|
| $SiO_2/Al_2O_3$ | 3.04 |
| $Na_2O/Al_2O_3$ | 1.06 |
| N/P | 2.0 |
| Crystal structure | ZK-21 |
| Sorption, g./100 g. of zeolite: | |
| n-Hexane | 11.3 |
| Water | 24.1 | a Ignited weight basis.
b Hydrated weight basis.

Example 5 utilized tri(tetramethylammonium) phosphate. If this is substituted by di(tetramethylammonium) hydrogen phosphate, the pH of the reaction mixture is lower and a product of a higher $SiO_2/Al_2O_3$ ratio can be expected. However, the ratio $$Na_2O/(Na_2O+[(CH_3)_4N]_2O)$$

increases sufficiently to cause some zeolite Y to crystallize along with zeolite ZK-21. This ratio can be lowered, however, without effecting the pH by addition of tetramethylammonium bromide, as shown in the following example:

Example 10

Sodium aluminate, 1.47 g. (43.3% $Al_2O_3$; 37.7% $Na_2O$), equivalent to 6.25 millimoles of $Al_2O_3$, was dissolved in a mixture of 38 g. of a 25% solution of tetramethylammonium hydroxide (104.5 millimoles) and 5.75 g. of an 85% phosphoric acid (50 millimoles). Tetramethylammonium bromide, 8 g. (52 millimoles), was added and dissolved under dilution to 65 ml. Then a solution of 10.33 g. of sodium metasilicate (24.55% $Na_2O$; 21.9% $SiO_2$) in 25 ml. of water was added under stirring within two seconds. The stirring was discontinued, when a gel had formed, and the flask with the reaction mixture was placed at constant temperature of 90° C. After 5 days the crystallization was complete.

The composition of the reaction mixture can be summarized as follows—

Molar ratio:
| | |
|---|---|
| $SiO_2/Al_2O_3$ | 6.0 |
| $Na_2O/Al_2O_3$ | 7.86 |
| $(Na_2O+[(CH_3)_4N]_2O)/Al_2O_3$ | 20.4 |
| $Na_2O/(Na_2O+[(CH_3)_4N]_2O)$ | 0.386 |
| $(Na_2O+[(CH_3)_4N]_2O\text{ }^a)/P_2O_5$ | 4.06 |
| $P_2O_5/Al_2O_3$ | 3.99 |
| $H_2O/(Na_2O+[(CH_3)_4N]_2O)$ ca. | 39 | a Hydroxide only.

The properties of the product were—

Wt. percent:
| | |
|---|---|
| $SiO_2$ | 57.5 |
| $Al_2O_3$ | 24.2 |
| $Na_2O$ | 16.0 |
| $SiO_2/Al_2O_3$ | 4.04 |
| $Na_2O/Al_2O_3$ | 1.09 |
| Crystal structure | ZK-21 |
| Sorption, g./100 g. of zeolite: | |
| Cyclohexane | 1.18 |
| n-Hexane | 12.4 |
| Water | 23.8 |

2.74% C; 0.79% N; 0.90% P; 81.8% ash; N/P=1.94.

In Example 9 waterglass has been used as the silica source. When the silica to alumina ratio of the reaction mixture is raised to 6, the resulting product is considerably more siliceous, as shown in Example 11:

Example 11

Sodium aluminate, 1.47 g. (43.3% $Al_2O_3$; 37.7% $Na_2O$), equivalent to 6.25 millimoles of $Al_2O_3$, was dissolved in a mixture of 57 g. of a 25% solution of tetramethylammonium hydroxide (157 millimoles) and 5.75 g. of an 85% phosphoric acid (50 millimoles). The solution was diluted to 65 ml. and a mixture of 7.8 g. (37.5 millimoles of $SiO_2$) of waterglass Q (8.9% $Na_2O$; 28.7% $SiO_2$) and 15 ml. of water added under stirring. Stirring was discontinued and the flask with the reaction mixture placed in a bath at 90° C. After 5 days the crystallization was complete.

The composition of the reaction mixture can be summarized as follows—

Molar ratio:
| | |
|---|---|
| $SiO_2/Al_2O_3$ | 6.0 |
| $Na_2O/Al_2O_3$ | 3.24 |
| $(Na_2O+[(CH_3)_4N]_2O)/Al_2O_3$ | 15.75 |
| $Na_2O/(Na_2O+[(CH_3)_4N]_2O)$ | 0.206 |
| $(Na_2O+[(CH_3)_4N]_2O)/P_2O_5$ | 3.94 |
| $P_2O_5/Al_2O_3$ | 3.99 |
| $H_2O/(Na_2O+[(CH_3)_4N]_2O)$ ca. | 45 |

The properties of the product were—

Wt. percent:
| | |
|---|---|
| $SiO_2$ | 56.0 |
| $Al_2O_3$ | 25.5 |
| $Na_2O$ | 15.8 |
| $SiO_2/Al_2O_3$ | 3.73 |
| $Na_2O/Al_2O_3$ | 1.02 |
| Crystal structure | ZK-21 |
| Sorption, g./100 g. of zeolite: | |
| Cyclohexane | 1.15 |
| n-Hexane | 13.2 |
| Water | 24.6 |

3.65% C; 0.97% N; 0.79% P; 79.1% ash; N/P=2.72.

What is claimed is:

1. A solid crystalline aluminosilicate having the composition, in its dehydrated form, expressed in terms of approximate mol ratios of oxides as follows:

$$1.0\pm0.2M_{2/n}O:Al_2O_3.YSiO_2:ZP_2O_5$$

wherein M is a metal cation, $n$ is the valence of M, Y is between about 1.9 and 4.5 and Z is between about 0.01 and $(Y+2)/_{48}$, said crystalline aluminosilicate having an X-ray diffraction pattern substantially as shown in Table 1.

2. A solid crystalline aluminosilicate according to claim 1 wherein M is a sodium and $n$ is 1.

3. A solid crystalline aluminosilicate according to claim 1 wherein Y is between about 2.8 and 4.0, said crystalline aluminosilicate being capable, in its sodium form, of selectively sorbing straight chain hydrocarbons while excluding branched-chain and cyclic hydrocarbons.

4. A solid crystalline aluminosilicate according to claim 1 wherein Y is between about 1.9 and 2.8.

5. A process for preparing the crystalline aluminosilicate of claim 1 which comprises preparing a reaction mixture containing a source of silicate, aluminate, phosphate, phosphatoaluminate, hydroxyaluminate, tetramethylammonium, and sodium ions; the composition of said mixture, expressed as mol ratios, being as follows:

| | |
|---|---|
| $SiO_2/Al_2O_3$ | Between about 3 and about 10. |
| $Na_2O/(Na_2O+[(CH_3)_4N]_2O$ | Between about 0.10 and about 0.55. |
| $(Na_2O+[(CH_3)_4N]_2O)/P_2O_5$ | Between about 2 and about 10. |
| $P_2O_5/Al_2O_3$ | At least about 2. | and digesting said mixture for a time sufficient to result in the formation of said crystalline aluminosilicate.

6. A process according to claim 5 wherein said composition, expressed as mol ratios, is as follows:

| | |
|---|---|
| $SiO_2Al_2O_3$ | Between about 3 and about 6. |
| $Na_2O/(Na_2O+[(CH_3)_4N]_2O)$ | Between about 0.1 and about 0.4. |
| $Na_2O+[(CH_3)_4N]_2O/P_2O_5$ | Between about 2.5 and about 5. |
| $P_2O_5/Al_2O_5$ | About 4 or above. |

7. A process according to claim 5 wherein the source of said silicate ions is sodium metasilicate.

8. A process according to claim 5 wherein the source of said silicate ions is waterglass.

9. A process according to claim 5 wherein the source of said tetramethylammonium ions is selected from tetramethylammonium hydroxide, tetramethylammonium chloride and tetramethylammonium bromide.

References Cited

UNITED STATES PATENTS

| 2,882,243 | 4/1959 | Milton | 23—113 |
| 3,228,969 | 1/1966 | Kerr | 23—113 X |
| 3,247,195 | 4/1966 | Kerr | 23—112 X |

OSCAR R. VERTIZ, *Primary Examiner.*

EDWARD J. MEROS, *Examiner.*